(No Model.)
E. TODD.
GANG HAY RAKE.
No. 422,167. Patented Feb. 25, 1890.
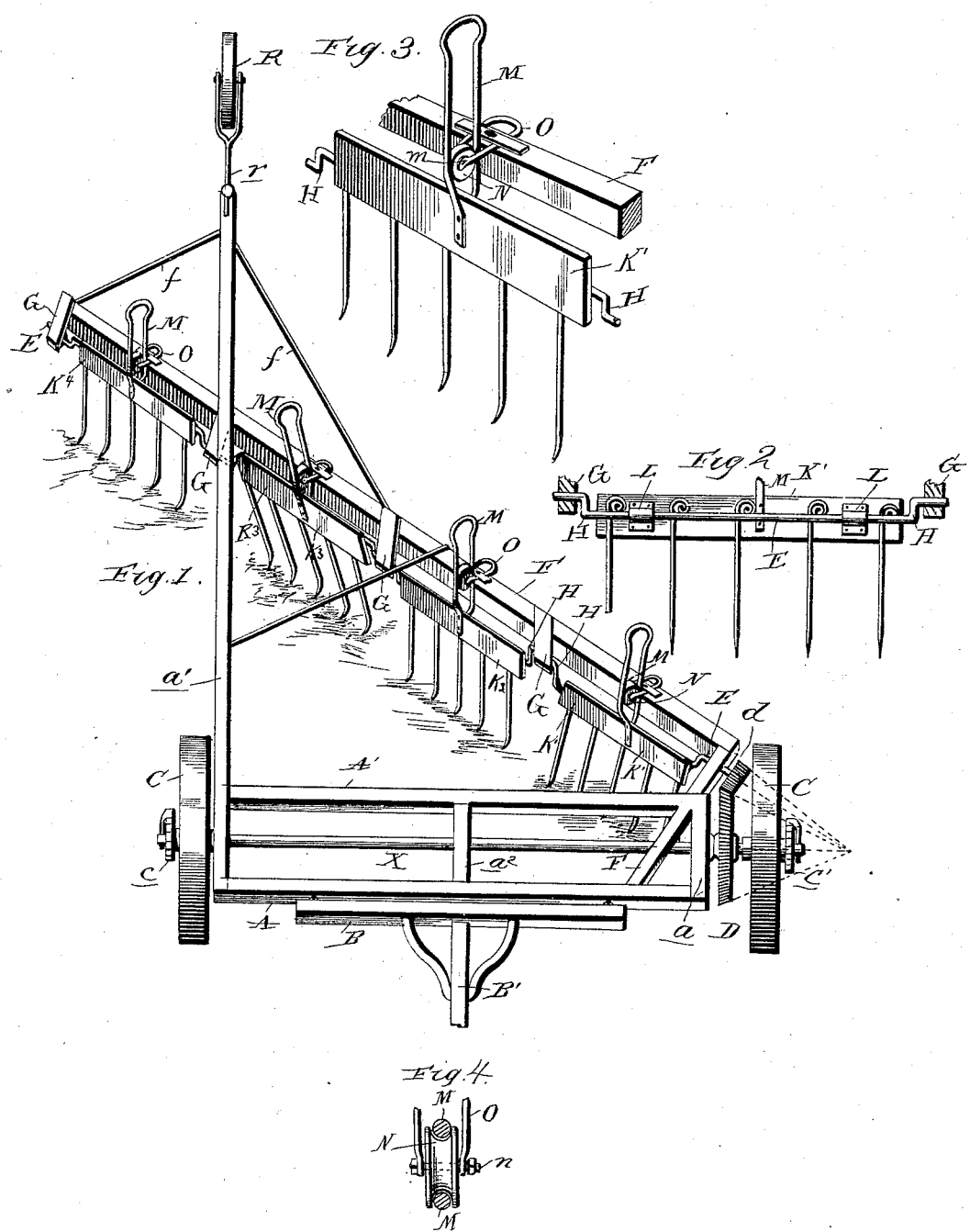
Witnesses
Inventor
Elihu Todd
By his Attorneys

UNITED STATES PATENT OFFICE.

ELIHU TODD, OF MANCHESTER, IOWA.

GANG HAY-RAKE.

SPECIFICATION forming part of Letters Patent No. 422,167, dated February 25, 1890.

Application filed September 26, 1889. Serial No. 325,136. (No model.)

*To all whom it may concern:*

Be it known that I, ELIHU TODD, a citizen of the United States, residing at Manchester, in the county of Delaware and State of Iowa, have invented certain new and useful Improvements in Gang Hay-Rakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to horse hay-rakes which gather the hay and deposit it in a row parallel with the line of advance of the machine.

The improvement consists of the novel features which will be hereinafter more fully described and claimed, and which are shown in the annexed drawings, in which—

Figure 1 is a top plan view of a machine embodying my invention. Fig. 2 is a rear view of the rakes, showing the manner of suspending them from the cranks of the crank-shaft. Fig. 3 is a perspective detail view showing the means for rocking the rakes on the cranks of the crank-shaft. Fig. 4 is a horizontal section showing the guide-arm, the guide-roller, and the clevis on an enlarged scale.

The main frame is composed of the longitudinal beam A A' and the side and intermediate bars $a$ $a'$ $a^2$, and is provided with a tongue B B' and with rotating axle X and driving-wheels C C. The gear-wheel D is keyed on axle X and meshes with the pinion $d$ on the crank or rake shaft E E. The side bar $a'$ is projected rearward some distance to support and form a brace for the rear end of the rake-beam F, and is prolonged, as shown, in the rear of the rake-beam, to carry the swiveled caster-wheel R, which is provided with a long vertical stem $r$, which is adjustably connected therewith to the rear of the machine, and can be raised to enable the rake-teeth to clear the ground when moving the machine from one place to another.

$c$ $c'$ are ratchets for putting the machine in and out of gear.

The rake-beam F is strengthened by the braces $f f$, and is set at an oblique angle thirty degrees or more from the axle X, and is supported at its inner end by the oblique brace F, which is secured to the beams A and A'. A series of shaft-hangers G G G G are attached to the beam F for the rake or crank shaft to revolve in. This rake or crank shaft E is journaled at its ends and at intermediate and equidistant points, thus dividing it into equal portions, which are deflected to form cranks H H, which extend in different directions and in different relative planes. The rakes K' $K^2$ $K^3$ $K^4$ are attached to the straight portions of the cranks H by the boxes L, as shown in Fig. 2, between the hangers G G, and are each provided with a guide-arm M, which is attached to the rake-head by bolts or rivets. This guide-arm M is loop-shaped, and moves up and down on a small grooved wheel N as the rake is revolved by the rake-shaft E, and controls the rocking or oscillating motion of the rakes, as desired. This small wheel N is journaled on a pin or bolt $n$, held in position by the clevis O, as shown most clearly in Figs. 3 and 4. The clevis O is adjustably but rigidly secured to the rake-beam F, and by moving it forward or backward the desired fulcrum is obtained and the proper movement of the rake attained. The guide-arm M is enlarged at its upper end to permit the removal of the small grooved wheel without unbolting it from the rake-head. This operation will be readily understood from Fig. 4, which shows the ends of the clevis connected by the bolt $n$, on which the wheel N is mounted. To remove the rake it is only necessary to take out the bolt $n$ and pull the guide-arm forward. The roller N is then carried to the enlarged portion of the guide-arm, where it is removed by a lateral movement. By having the roller N grooved in its periphery and the portions of the guide-arm fitted in said groove the guide-arm is prevented from rubbing against the sides of the clevis and is caused to move in a given direction. The rakes are provided with spring-teeth, as shown. When the machine is drawn over the field and thrown into gear, the axle X is turned by the driving-wheels C C, and the rake-shaft is revolved through the gearwheels D $d$, as shown. Owing to the crank portions of the crank-shaft being at different angles or in different planes to each other, the gang of rakes is rotated and brought into the hay alternately or one following the other in raking and pushing the hay forward or sidewise, the angle from which they are set from the draft of the machine giving a lateral movement to the hay, which leaves it in a continuous windrow at the outside of the machine. The movement imparted by the guide-arm M traveling on the grooved wheel N is a sudden forward tilt of the rake-head K on its own axis, which throws or kicks the hay forward and sidewise just as it is lifted by the upward motion of the portion of the rake-shaft E to which it is attached.

The action of the three or more rakes in the gang is as follows, viz: Rake K' strikes the hay first, moves it forward and sidewise, and pushes or kicks it toward rake $K^2$. Rake $K^2$ repeats the action of rake K' and pushes the hay to rake $K^3$. Rake $K^3$ repeats the action of K' and $K^2$ and pushes hay to $K^4$, which delivers hay in a continuous windrow outside of the width of the machine. The increased quantity of hay in front of each successive rake from the outside of the machine is moved by giving each rake more of the tilting or kicking movement than the rake next inside of it, as described, by the agency of the guide M traversing the grooved wheel N and the adjustment of the clevis-holder O, Fig. 3.

Having fully described my invention, what I claim, and desire to secure by Letters Patent, is—

1. In a hay-rake, the combination, with the crank-shaft and the rake journaled thereon, of the loop guide-arm extending from the rake and enlarged at its upper end, and the clevis O, having roller N, substantially as and for the purpose described.

2. In a hay-rake, the combination, with the beam F, the crank-shaft, and the rake journaled on said crank-shaft and having a guide-arm, of the horizontally-adjustable clevis O, having roller N for controlling the rocking motion of the rake, substantially as described, for the purpose specified.

3. The hereinbefore-specified hay-rake, comprising the frame A A' $a$ $a'$ $a^2$, the side bar $a'$ being projected rearwardly, the caster R, adjustably connected with the rear end of said bar $a'$, the oblique rake-beam F, supported at its outer end by bar $a'$ and at its inner end by oblique brace F', the rake-shaft E, having a series of cranks which are arranged at different angles or in different planes, the hangers G between the cranks, and the beam F and shaft E, the rakes journaled on cranks H, the guide-arms M, the clevis O, having rollers N adjustably connected with the beam F, the revolving axle having drive-wheels geared with the crank-shaft, and the shaft-tongue, substantially as described.

In testimony whereof I affix my signature in presence of two witnesses.

ELIHU TODD.

Witnesses:
A. O. STANGER,
S. W. STOOKEY.